United States Patent

[11] 3,583,552

[72] Inventors George Renwick
Seaham, England
[21] Appl. No. 842,675
[22] Filed July 17, 1969
[45] Patented June 8, 1971
[73] Assignees R. B. Bolton (Mining Engineers) Limited
Consett, England
[32] Priority July 22, 1968
[33] Great Britain
[31] 34,914/68

[54] CONVEYOR PAN JOINT
8 Claims, 2 Drawing Figs.
[52] U.S. Cl. ................................................... 198/195,
198/168
[51] Int. Cl. .................................................B65g 17/38,
[50] Field of Search............................................ 198/168,
189, 193, 195; 248/298; 59/84, 85, 95; 287/20.5,
54.1, 130

[56] References Cited
UNITED STATES PATENTS
3,509,987  5/1970  Flaith et al..................... 198/195

Primary Examiner—Joseph Wegbreit
Assistant Examiner—Bruce H. Stoner, Jr.
Attorneys—Jacobs & Jacobs ABSTRACT: A pan joint for a scraper conveyor consists of blocks secured to adjacent pans and a connecting bolt for linking the two blocks. The bolt has a shank with an enlarged head at each end. Adjacent end portions of the blocks are each provided along one side with a longitudinal channel and these channels house the shank of the connecting bolt, whilst the heads of the bolt are housed in cavities with which the inner ends of the channels respectively communicate. In the first block at least (and preferably in the second block also) the mouth of the channel is extended for a distance over the cavity to provide a pair of flanges for retaining the bolt head against lateral displacement from the cavity. The total length of the channels is less than the length of the bolt shank, the difference in length being less than the extent of the pair of flanges in the first block, but greater than the extent of the pair of flanges (if any) in the second block. Displaceable stop means in the second block limit longitudinal movement of the bolt in the block so as to hold the bolt in the block so as to hold the bolt head at that end within the cavity.

PATENTED JUN 8 1971 3,583,552

INVENTOR
GEORGE RENWICK

CONVEYOR PAN JOINT

BACKGROUND OF THE INVENTION

1. Field of the Invention

This invention relates to conveyors of the type wherein solid materials, such as coal, are conveyed along a trough by engagement with a series of flights extending transversely across the trough and moving longitudinally along the trough.

2. Description of the Prior Art

One kind of conveyor of this type is described in copending Pat. application Ser. No. 757883 (R,B. Bolton), but other conveyors of this general type are well known in the mining art. The trough is usually built up from a series of pans removably joined end to end. During use the trough may have to be moved tranversely without being dismantled, e.g. when used at a mining face. For this reason at least the joints between the pans, while being secure, must allow for a certain degree of lateral and vertical angular displacement between the pans.

In the past, the pan joints have been effected by nut and bolt connections, and difficulty has arisen through corrosion of the nuts and bolts, with the result that bolts must often be severed in order to dismantle the joints.

SUMMARY OF THE INVENTION

It is an object of the present invention to provide an improved pan joint for conveyors of the type described and in which the above difficulty has been avoided.

According to the present invention there is provided a joint for pans of conveyors of the type described comprising a first block secured or adapted to be secured to one end portion of one pan and a second block secured or adapted to be secured to one end portion of another pan, such that the blocks lie adjacent each other when the pans are aligned, and a connecting bolt for linking the two blocks, said connecting bolt having a shank provided at each end with an enlarged head, adjacent end portions of said blocks each being provided along one side with a longitudinally extending channel, the channels being adapted to house when aligned the shank of the connecting bolt, the inner end of each channel, communicating with a cavity provided in the same side of the block and adapted to house a head of the bolt, the elongate mouth portion of the channel in at least the first block being extended for a distance over the cavity so as to provide a pair of flanges for retaining the bolt head against lateral displacement from the cavity, the total length of said channels being less than the length of the bolt shank, the difference in length being less than the extent of said pair of flanges in said first block, but greater than the extent of said pair of flanges (if any) in the second block, displaceable stop means being provided in said second block limiting longitudinal movement of the bolt within the block whereby the bolt head at that end is held within the cavity.

The adjacent end faces of the blocks may be shaped so as to cooperate in limiting the degree of angular displacement between the blocks in any desired direction.

In a preferred form the second block is provided with a said pair of flanges whose extent is not substantially greater than the length of the bolt head which they retain. Said displaceable stop means preferably comprises a member located within the cavity of the second block and pivotable between an operative position wherein it lies closely longitudinally adjacent the bolt head, and an inoperative position wherein it allows the bolt head in the second block to be longitudinally withdrawn clear of the retaining flanges. The said member may be restrained against accidental displacement from one or other said positions by resilient means acting between the member and the block to provide frictional resistance against pivotal movement of the member. The member may be further retained in the operative position by means of a transverse step provided on the member engaging a corresponding stepped portion of the block, the two stepped portions being arranged so that their interengagement may be overcome by relative displacement of the member and the block against said resilient means.

BRIEF DESCRIPTION OF THE DRAWINGS

In order that the invention may be more clearly understood a specific embodiment will now be described with reference to the accompanying drawing wherein.

DESCRIPTION OF THE PREFERRED EMBODIMENT

Figure 1:
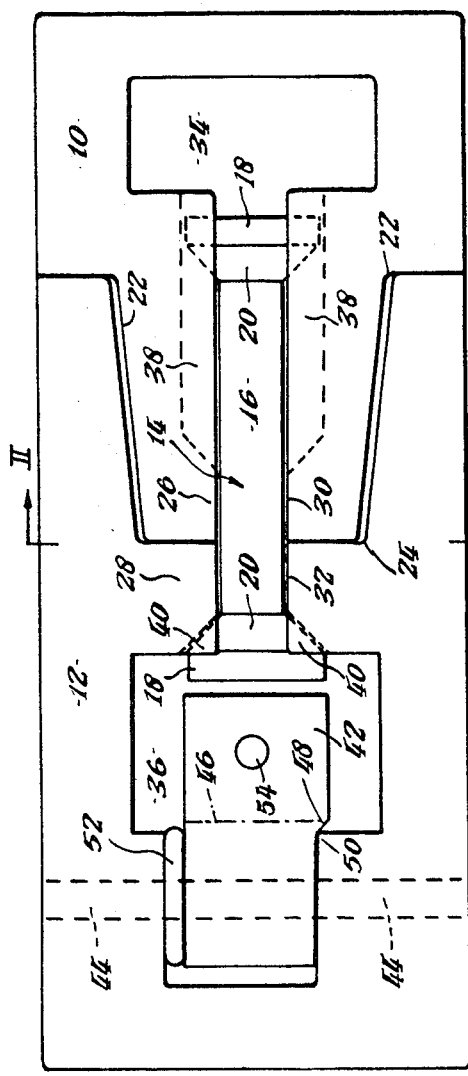
FIG. 1 shows a side elevation of a joint.
Figure 2:
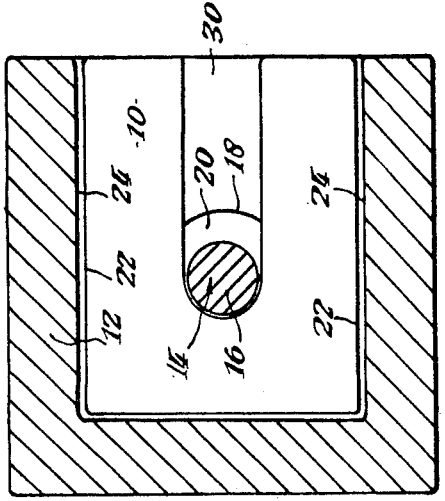
FIG. 2 shows a cross section on the line II–II of FIG. 1.

The joint comprises a manganese-steel first block 10 and a manganese-steel second block 12, linked by a steel connecting bolt generally designated 14. The bolt comprises a shank 16 of uniform cross section and provided at each end with an enlarged head 18. The portion 20 of each head 18 adjacent the shank 16 is of frustoconical form. The adjacent end surfaces 22, 24 of the blocks 10, 12 respectively are shaped so as to cooperate in limiting the degree of vertical angular displacement between the blocks. The face 22 has the shape of a tenon tongue, and the face 24 has the shape of a mortice mouth. Adjacent end portions 26, 28 of the blocks 10, 12 respectively are provided along one side with U-shaped channels 30, 32 respectively. The channels 30, 32 communicate at their inner ends with cavities 34, 36 respectively provided in the same sides of the blocks. The bolt 14 lies with its shank 16 housed within the channels 30, 32 and its heads 18 housed within the cavities 34, 36. The portions of the cavities 34, 36 adjacent the ends of the channels 30, 32 respectively are chamfered so as to provide seating for frustoconical portions 20 of the bolt heads 18. The elongate mouth portion of each U-shaped channel 30, 32 is extended for a distance over the cavities 34, 36 respectively so as to provide pairs of flanges 38, 40 respectively adapted to retain the bolt heads 18 against lateral displacement from the cavities. The combined total length of the channels 30, 32 is less than the length of the bolt shank 16, the difference in length being less than the length of the flanges 38 in the block 10 but greater than the length of the flanges 40 in the block 12. Furthermore, the length of the flanges 40 in the block 12 is somewhat less than the length of the bolt head 18.

A displaceable stop means for the bolt head 18 in the block 12 is provided by a steel bar 42, of generally rectangular section. The bar is mounted within the cavity 36 by means of a vertical pivot pin 44 and is pivotable in a horizontal plane from an operative position (shown in FIG. 1) wherein it lies closely longitudinally adjacent the end of the bolt head 18, and an inoperative position 46 at about 90° to the operative position which allows the bolt head 18 to be longitudinally withdrawn from behind the retaining flanges 40. The bar 42 is retained in the operative position at least partly by a transverse step portion 48 provided on the underside of the bar 42 engaging a corresponding step portion 50 in the block 12. A synthetic rubber pressure ring 52 is located around the pivot pin 44 between the upper surface of the bar 42 and the adjacent surface of the block 12. This rubber ring is under compression and thus provides a resilient means acting between the bar 42 and the block 12. This resilience not only holds the stepped portions 48 and 50 in interengagement, but also the thickness of the rubber ring is sufficient to allow the bar 42 to be displaced relative to the block 12 against the resilience of the ring sufficiently to enable the steps 48, 50 to be brought out of interengagement. To assist this, at least one of the stepped portions (in this case 48) is chamfered to provide a ramp surface. The ring 52 also provides frictional resistance to pivotal displacement of the bar 42. A transverse bore 54 is provided in the bar 42 into which a tommy-bar or other tool may be inserted in order to pivot the bar 42 between its operative and inoperative position.

As shown in FIG. 1, the blocks 10, 12 are allowed a limited amount of longitudinal displacement, as provided by the difference between the length of the shank 16 of the bolt 14 and the total length of the channels 30, 32. This displacement is, however, limited by engagement of the heads 18 in their respective seatings in the side portions of the cavities 34, 36 adjacent the channels 30, 32 respectively. The bolt is locked to the block 12 as a result of the head 18 being retained longitudinally by the bar 42 in its operative position and laterally by the flanges 40. A certain amount of play is clearly necessary between the bar 42 and the adjacent head 18 in order to permit the bar to be swung into and out of its operative position, but this play should be much less than would allow the head 18 to move clear of the lateral restraint provided by the flanges 40. When the bolt 14 is so locked to the block 12, it is thereby also locked to the block 10 (although a certain amount of relative longitudinal displacement between the bolt 14 and block 10 is allowed by virtue of the length of the shank 16 being greater than the combined length of the channels 30, 32), since the head 18 is retained within the cavity 34 by the flanges 38. Since the length of the flanges 38 is greater than the excess length of the shank 16 over the channels 30, 32 the bolt head 18 is prevented from moving clear of the retaining flanges 38.

An important feature of the present invention is that the joint can be quickly and easily dismantled should this be desired. Dismantling of the joints becomes necessary not only on the very rare occasions when the conveyor has to be dismantled, but also for the replacement of worn or damaged parts. Hitherto, in more conventional joints involving nut and bolt connections, the nut and bolts frequently became corroded and the bolts had to be severed in order to dismantle the joints. This is a particularly time-consuming operation and can result in considerable financial loss while the conveyor stands idle.

Joints of the present invention can be dismantled in the following way, as exemplified with reference to the embodiment as hereinbefore described and illustrated in the drawing. A tool is inserted into the bore 54 of the bar 42 and the bar is pivoted from the operative to the inoperative position. The bolt 14 is then moved longitudinally towards the block 12 so that the bolt head 18 lies clear of the retaining flanges 40. (If the blocks 10 and 12 have become displaced to the limit allowed by the bolt 14, then it will be necessary to draw them together somewhat in order to effect this longitudinal displacement of the bolt). The head 18 of the bolt is then withdrawn sideways from the cavity 36, the shank 16 of the bolt sliding outwardly through the U-shaped channel 32. The other head 18 of the bolt is still at this stage retained behind the flanges 38. When the first-mentioned head 18 is clear of the block 12 then the bolt 14 may be moved towards the block 10 thus allowing the other head 18 to be withdrawn from behind the flanges 38. The entire bolt is then withdrawn from the channels 30, 32 and clear of the blocks 10, 12. To reassemble the joint, the above steps are reversed.

In a conveyor, the conveying through a comprises a series of pans, each adjacent pair of pans being linked by a pair of joints provided one at each lateral side of the pan. The blocks 10, 12 are normally welded to the pans, but may be bolted or otherwise secured.

The particular design of joint hereinbefore described and illustrated in the drawing is given by way of example only and may be modified extensively in accordance with particular requirements. Thus the bolt, instead of having a solid unitary shank as described may have a jointed shank such as would be provided by two interconnected links one link rigidly secured to the bolt heads either directly or through intermediate shank portions.

What I claim and desire to secure by letters patent is:

1. A joint for pans of conveyors of the type in which solid materials are conveyed along a trough by engagement with a series of flights extending transversely across the trough and moving longitudinally along the trough, said joint comprising a first block secured or adapted to be secured to one end portion of one pan and a second block secured or adapted to be secured to one end portion of another pan, such that the blocks lie adjacent each other when the pans are aligned, and a connecting bolt having a shank provided at each end with an enlarged head, adjacent end portions of said blocks each being provided along one side with a longitudinally extending channel, the channels being adapted to house when aligned the shank of the connecting bolt, the inner end of each channel communicating with a cavity provided in the same side of the block and adapted to house a head of the bolt, the elongate mouth portion of the channel in at least the first block being extended for a distance over the cavity so as to provide a pair of flanges for retaining the bolt head against lateral displacement from the cavity, the total length of said channels being less than the length of the bolt shank, the difference in length being less than the extent of said pair of flanges in said first block, but greater than the extent of said pair of flanges (if any) in the second block, displaceable stop means being provided in said second block limiting longitudinal movement of the bolt within the block whereby the bolt head at that end is held within the cavity.

2. A pan joint according to claim 1 wherein the second block is provided with a said pair of flanges whose extent is not substantially greater than the length of the bolt head which they retain.

3. A pan joint according to claim 2 wherein said displaceable stop means comprises a member located within the cavity of the second block and pivotable between an operative position wherein it lies closely longitudinally adjacent the bolt head, and an inoperative position wherein it allows the bolt heat in the second block to be longitudinally withdrawn clear of the retaining flanges.

4. A pan joint according to claim 3 wherein said member is restrained against accidental displacement from one or other said positions by resilient means acting between the member and the block to provide frictional resistance against pivotal movement of the member.

5. A pan joint according to claim 4 wherein said member is further retained in the operative position by means of a transverse step provided on the member engaging a corresponding stepped portion of the block, the two stepped portions being arranged so that their interengagement may be overcome by relative displacement of the member and the block against said resilient means.

6. A pan joint according to claim 1 wherein the adjacent faces of the blocks are shaped so as to cooperate in limiting the degree of angular displacement between the blocks in one or more directions.

7. In a conveyor of the type in which solid materials are conveyed along a trough by engagement with a series of flights extending transversely across the trough and moving longitudinally therealong, a trough comprising pans joined end to end by means of pan joints according to claim 1.

8. In a conveyor of the type in which solid materials are conveyed along a trough by engagement with a series of flights extending transversely across the trough and moving longitudinally therealong, a trough comprising pans joined end to end by means of pan joints according to claim 3.